F. SALMON.
HOOK AND EYE.
APPLICATION FILED MAR. 24, 1913.
1,202,434.                                                  Patented Oct. 24, 1916.
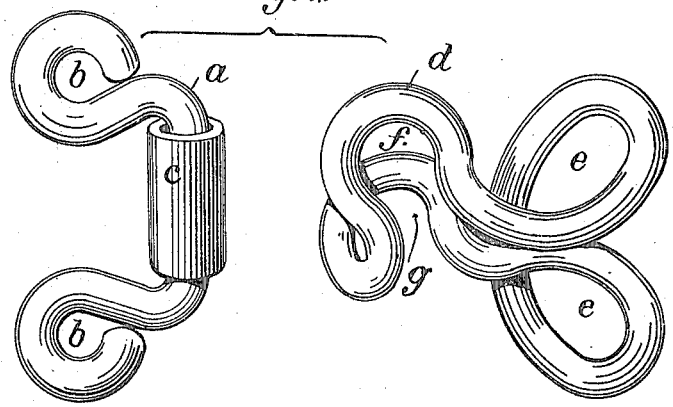
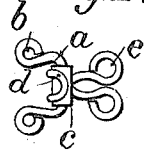
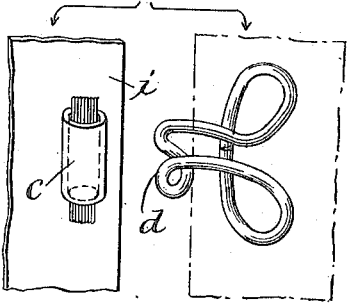
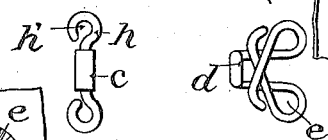
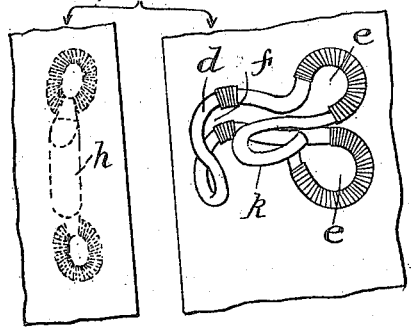
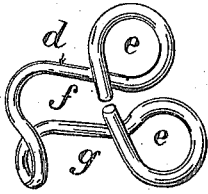

UNITED STATES PATENT OFFICE.

FERNAND SALMON, OF PARIS, FRANCE.

HOOK AND EYE.

1,202,434.   Specification of Letters Patent.   Patented Oct. 24, 1916.

Application filed March 24, 1913. Serial No. 756,558.

*To all whom it may concern:*

Be it known that I, FERNAND SALMON, of 20 Rue du Faubourg St. Martin, Paris, France, engineer, have invented a new and useful Improvement in Hooks and Eyes, which improvement is fully set forth in the following specification.

The object of this invention is to provide improved hooks and eyes which may with advantage replace both the ordinary hooks and eyes and also spring hooks and press fasteners. They are employed in the same manner as before and although they can be unhooked with extreme ease yet they efficiently retain the portions of the garment for example to be united. They have an advantage over press fasteners in that the connection is more flexible.

According to this invention the entrance to the mouth of the hook is constricted, such mouth opening at right angles to the object to which the hook is attached, the mouth when the eye is in its hook being beyond the center of the eye. The size of that portion of the eye entering said mouth is greater than that of the constriction.

The eye may be formed of a solid piece or may be a mere tube or again that portion engaging in the hook may carry a tube (or tubes) or the like which has a certain amount of play.

In order to withdraw the eye from the hook, one or other must be pulled in the opposite direction to the pressure exerted for the insertion.

The accompanying drawings which illustrate the invention show various methods of carrying it out.

In this drawing: Figure 1 represents a perspective view of a hook and eye embodying my invention, disengaged; Fig. 2 an elevation of the same engaged; Fig. 3 a similar view of a modified form of hook-and-eye, disengaged; Fig. 4 a perspective view of a modified form of hook; Fig. 5 a similar view of another modification, the hook-and-eye being disengaged; and Figs. 6 and 7 similar views of two further modifications of hooks and eyes embodying this invention.

*a*, Fig. 1, is an eye of ordinary shape formed of wire for example and provided with the usual loops *b* for attachment. *c* is a tube of metal for example threaded upon the portion engaging in the hook. *d* is the hook also formed of wire for example and comprising ordinary attachment loops *e e* and a space *f* corresponding in size to that of the tube *c* and formed by the curvature of the hook. *g* is the constricted mouth of the space *f* and is smaller than the diameter of the tube.

The wire forming the hook may of course be bent in any other manner as indicated in Figs. 2, 3, 4 and 5. In particular the wire may after being bent to form the loops *e* of the hook form one of the sides of the entrance to the space *f* opposite the rounded end beak of the hook properly so called as in Fig. 4. From this figure it will be noted that the ends of the wire, after forming the loops *e*, are brought opposite the beak *d* of the hook. As shown, these ends abut one with respect to the other, so that when the hook is in engagement with the hook-engaging cylindrical part, the separation of these ends will be prevented. The wall of the space opposite to that formed by the curve of the hook may also be formed as in Fig. 5 by a bent projecting portion *k* facing the bent end of the hook and formed by the wire between the two loops *e*. Again the eye *a* may be replaced by the eye *h*, Fig. 3 also provided with a tube *c* and attachment loops *h'*.

The eye may consist of a mere tube *c* as in Fig. 6 secured in any suitable manner for example by sewing to the fabric *i*; fastening is effected as previously indicated by placing the hook on the tube *c* and pressing until the tube enters the space formed by the curve of the hook.

The eye may be formed as in Fig. 7 of a single piece *h* of suitable size and either solid or hollow, provided with attachment loops *h'* but without a movable tube *c*. In this figure the hook is formed by cutting and stamping a sheet of metal. The walls forming the entrance to the space *f* of the hook are then formed on the one hand by the bent point of the hook and on the other by a tongue *j* cut from the piece and suitably bent. The hook may also be modified in its details and in particular the constricted entrance to the space formed by the bending of the hook may be produced in any suitable manner.

In all cases it will be noted that the fastening hook, whether made of wire or of sheet-metal, is formed of material of less thickness than the diameter of the straight cylindrical part comprising or forming a portion of the eye. Where the hook is formed of wire, the diameter of said wire is less than that of the said cylindrical part. It will also be observed that, when the parts of the fastening are in engagement, the hook will fit around the cylindrical part in a substantially snug manner.

Claims:

1. In a hook-and-eye fastening, an eye comprising a cylindrical hook-engaging part, in combination with a hook formed from a wire of less diameter than the cylindrical part and having a hooked portion adapted to grasp the said eye, the mouth of said hooked portion being narrower than the diameter of the cylindrical part.

2. In a hook-and-eye fastening, an eye comprising a cylindrical hook-engaging part, in combination with a hook formed from a wire of less diameter than the cylindrical part and having a hooked portion adapted to grasp the said eye, the mouth of said hooked portion being narrower than the diameter of the cylindrical part and opening practically at right angles to the object to which the hook is attached.

3. In a hook-and-eye fastening, an eye comprising a cylindrical hook-engaging part, in combination with a hook formed from a wire of less diameter than the cylindrical part and having a hooked portion adapted to grasp the said eye, the mouth of said hooked portion being narrower than the diameter of the cylindrical part, the cylindrical part fitting substantially snugly within the hooked portion.

4. In a hook-and-eye fastening, a fastening hook formed of a wire bent to form two loops and a beak, the ends of the wire being arranged opposite the beak so as to form therewith a constricted mouth of the hook.

5. In a hook-and-eye fastening, an eye formed of a cylindrical part and means for securing the same to the object provided with the same, in combination with a hook made of material less in thickness than the cylindrical part, and having a constricted mouth, the said hook being adapted to fit around the cylindrical part.

6. In a hook-and-eye fastening, an eye comprising a cylindrical hook-engaging part, in combination with a hook formed from a wire of less diameter than the cylindrical part, and having a hooked portion for engaging said cylindrical part, the mouth of said hooked portion being unobstructed and narrower than the diameter of the cylindrical part.

7. In a hook-and-eye fastening, an eye comprising a cylindrical hook-engaging part, in combination with a hook formed from a wire of less diameter than the cylindrical part, and having a hooked portion for engaging said cylindrical part, the mouth of said hooked portion being unobstructed and narrower than the diameter of the cylindrical part and opening practically at right angles to the object to which the hook is attached.

8. In a hook-and-eye fastening, an eye comprising a cylindrical hook engaging part and means for attachment of the same, said means being substantially in axial alinement with the cylindrical part, in combination with a hook formed from a wire of less diameter than the cylindrical part and having a hooked unobstructed portion narrower than the diameter of the cylindrical part and opening practically at right angles to the object to which the eye is attached.

In testimony whereof I have signed this specification in the presence of two subscribing witnesses.

FERNAND SALMON.

Witnesses:
LUCIEN MEMMINGER,
FRÉDÉRIC COMBE.

Copies of this patent may be obtained for five cents each, by addressing the "Commissioner of Patents, Washington, D. C."